(12) United States Patent
Stretton

(10) Patent No.: US 9,346,551 B2
(45) Date of Patent: May 24, 2016

(54) ENGINE INSTALLATION

(71) Applicant: ROLLS-ROYCE PLC, London (JP)

(72) Inventor: Richard Geoffrey Stretton, Ashby-de-la-Zouch (GB)

(73) Assignee: ROLLS-ROYCE plc, London (GB)

( * ) Notice: Subject to any disclaimer, the term of this patent is extended or adjusted under 35 U.S.C. 154(b) by 84 days.

(21) Appl. No.: 14/173,394

(22) Filed: Feb. 5, 2014

(65) Prior Publication Data

US 2014/0252159 A1    Sep. 11, 2014

(30) Foreign Application Priority Data

Mar. 5, 2013   (GB) ................................. 1303860.9

(51) Int. Cl.
*B64D 27/00*   (2006.01)
*B64D 27/14*   (2006.01)
*B64D 29/04*   (2006.01)

(52) U.S. Cl.
CPC ................. *B64D 27/14* (2013.01); *B64D 29/04* (2013.01); *B64D 2027/005* (2013.01); *Y02T 50/44* (2013.01); *Y02T 50/66* (2013.01)

(58) Field of Classification Search
CPC ........ B64D 27/14; B64D 27/20; B64D 29/04; B64D 2027/005; B64D 2027/026; B64D 2027/26

See application file for complete search history.

(56) References Cited

U.S. PATENT DOCUMENTS

| | | | |
|---|---|---|---|
| 2,120,821 A * | 6/1938 | Waseige | B64D 35/08 244/60 |
| 3,020,004 A | 2/1962 | Blyth et al. | |
| 3,054,577 A * | 9/1962 | Wolf et al. | 60/226.1 |
| 3,106,369 A | 10/1963 | Borst | |
| 3,194,516 A * | 7/1965 | Messerschmitt | 244/74 |
| 3,212,733 A * | 10/1965 | Kutney | 244/54 |
| 3,229,933 A | 1/1966 | Kutney | |
| 3,312,426 A * | 4/1967 | Fowler | 244/12.5 |
| 3,366,350 A * | 1/1968 | Hoffert et al. | 244/55 |
| 3,547,379 A * | 12/1970 | Kappus | B64D 27/26 244/53 R |
| 4,871,130 A | 10/1989 | Schulze | |
| 5,443,229 A | 8/1995 | O'Brien et al. | |
| 5,961,067 A | 10/1999 | Hall et al. | |
| 6,279,852 B1 * | 8/2001 | Dusserre-Telmon | B64D 35/08 244/60 |
| 6,688,552 B2 * | 2/2004 | Franchet et al. | 244/12.3 |
| 6,792,745 B2 * | 9/2004 | Wojciechowski | 60/224 |
| 6,845,606 B2 * | 1/2005 | Franchet et al. | 60/225 |
| 7,107,755 B2 | 9/2006 | El Hamel et al. | |
| 7,540,450 B2 | 6/2009 | Brand et al. | |
| 7,665,689 B2 * | 2/2010 | McComb | 244/12.3 |

(Continued)

FOREIGN PATENT DOCUMENTS

DE    10 2008 024 463 B4    2/2011
EP        1 331 378 A2        7/2003

(Continued)

OTHER PUBLICATIONS

British Search Report issued in British Application No. GB1303860.9 on Jul. 29, 2013.

*Primary Examiner* — Philip J Bonzell
(74) *Attorney, Agent, or Firm* — Oliff PLC

(57) ABSTRACT

A fuselage mounted gas turbine engine installation the installation includes at least one propeller stage and a gas turbine core arranged in use to drive the propeller stage. The core is external to the fuselage and the rotational axes of the core and propeller stage are offset with respect to each other.

15 Claims, 3 Drawing Sheets

(56) References Cited

U.S. PATENT DOCUMENTS

| | | |
|---|---|---|
| 7,752,834 B2 * | 7/2010 | Addis .............................. 60/224 |
| 8,015,796 B2 * | 9/2011 | Babu et al. ................... 60/226.1 |
| 8,152,096 B2 | 4/2012 | Smith |
| 8,256,709 B2 | 9/2012 | Negulescu |
| 8,402,740 B2 * | 3/2013 | Guemmer ................... 60/226.1 |
| 2002/0001539 A1 | 1/2002 | DiCesare et al. |
| 2003/0168552 A1 | 9/2003 | Brown |
| 2008/0099632 A1 | 5/2008 | Addis |
| 2009/0229243 A1 | 9/2009 | Guemmer |
| 2010/0155526 A1 | 6/2010 | Negulescu |
| 2012/0234968 A1 | 9/2012 | Smith |
| 2013/0062463 A1 | 3/2013 | Lord |

FOREIGN PATENT DOCUMENTS

| | | |
|---|---|---|
| EP | 1 331 386 A2 | 7/2003 |
| EP | 1 918 199 A2 | 5/2008 |
| FR | 2 942 773 A1 | 9/2010 |
| GB | 2 400 411 A | 10/2004 |
| WO | WO 88 04258 A1 | 6/1988 |

* cited by examiner

ENGINE INSTALLATION

The present invention relates to fuselage mounted gas turbine engine installations and aircraft. More specifically the invention relates to the way in which the arrangement of a core and a propeller stage of a gas turbine engine are arranged and supported by a fuselage. The invention may have specific application to engines of open-rotor configuration but is not intended to be limited to such applications.

A fundamental gas turbine engine installation consideration is where the engine(s) are mounted. In aircraft, basic options include under-wing mounted, in-wing mounted, in fuselage mounted and fuselage mounted, the latter extending externally directly from the fuselage or supported by a relatively short pylon extending from the fuselage. Each of these installations has advantages and disadvantages and may be best suited to particular applications. Particular benefits of fuselage mounted engines may include the potential for the engines to be positioned further from the ground (potentially reducing debris intake and landing gear length and complexity), the potential for reduced engine interference with wing aerodynamics and the reduction in asymmetric yaw in the event of engine failure.

Some aircraft utilise open rotor or turbo-prop gas turbine engines. When these are fuselage mounted it is necessary for the engine to be mounted on a pylon having, sufficient length to allow clearance between the fuselage and the blade tips. This tends to result in a relatively long pylon, which increases the cantilevered load that the engine exerts on the pylon attachment and means that the pylon and aircraft structure must have increased strength (and therefore likely increased weight). Further the longer pylon will cause increased aerodynamic drag due to the increased scrubbed area, consequently reducing efficiency. It may also be desirable to increase the clearance between the fuselage and the blade tips beyond the minimum necessary so as to reduce noise if the aircraft has a passenger cabin and/or to avoid undesirable aerodynamic effects between the blades and fuselage.

According to a first aspect of the invention there is provided a fuselage mounted gas turbine engine installation, the installation optionally comprising at least one propeller stage and optionally a gas turbine core optionally arranged in use to drive the propeller stage, where the core is optionally external to the fuselage and the rotational axes of the core and propeller stage are optionally offset with respect to each other.

For convenience optional features and characteristics of the at least one propeller stage are discussed in the context of a single propeller stage. Nonetheless it will be appreciated that these features and characteristics may be present in one, some or all of the rotor stages provided in the gas turbine engine installation. In particular where two or more propeller stages are provided their axes of rotation may be co-axial.

By positioning the core externally to the fuselage, design difficulties and/or compromises resulting from encasing the core within the fuselage may be avoided. Further easier maintenance access to the core may be facilitated. The offset between the rotational axes of the core and propeller stage may mean that only the propeller stage (and not the whole engine) needs to be positioned at a sufficient distance from the fuselage to provide blade tip clearance. This may facilitate additional design choices especially where (as here) the core is external to the fuselage.

In some embodiments the fuselage is that of an aircraft.

In some embodiments the position of the core is such that the cantilevered load produced by the core and propeller stage combined is reduced in comparison with a combined cantilevered load that would be produced if the rotational axes of the core and propeller stage were the same. It may be for example that the rotational axis of the core is nearer to the fuselage than the rotational axis of the propeller stage. Further in some embodiments at least part of the core is between the propeller stage and the fuselage.

As will be appreciated such arrangements may have the advantage that while the propeller stage is sufficiently far from the fuselage to give the desired/required tip clearance, the core (not requiring the same clearance) may be positioned nearer to the fuselage. In this way the overall cantilevered load of the installation may be reduced (with potential consequent weight and drag reductions). From another perspective it may be considered that the embodiments mentioned above would allow greater propeller stage tip clearance to the fuselage for a given cantilevered load. This may allow longer blades, reduced noise, improved aerodynamic properties and/or increased blade separation between the blades of different engine installations (with potential benefits in mitigating blade release).

In some embodiments the installation is arranged to be rear mounted on the fuselage. It may for example be that the installation is arranged to be positioned backward of a wing of an aircraft. Additionally or alternatively the installation may be mounted within the rear half or rearmost quarter of the fuselage. In some embodiments the installation may be arranged to be mounted adjacent an empennage.

In some embodiments an offset gearbox is used to operatively link the core and propeller stage. In alternative embodiments meshed gears or bevel gears and a transfer shaft are used to operatively link the core and propeller stage.

In some embodiments the propeller stage is supported by a propeller stage pylon which extends from the fuselage.

In some embodiments the propeller stage is located at a distal end of the propeller stage pylon with respect to the fuselage. In this way the fuselage blade tip clearance may be increased for a given propeller stage pylon length.

In some embodiments the propeller stage pylon is arranged in use to be substantially parallel to the wings of an aircraft to which it is attached.

In some embodiments the core is at least partially supported by the propeller stage pylon.

In some embodiments the core is at least partially supported by a core pylon that is separate to the propeller stage pylon.

In some embodiments an engine nacelle is provided containing the core and at least a portion of drive gear for the propeller stage, the blades of the propeller stage being arranged to rotate outside of the engine nacelle. This may be advantageous where the offset between the rotational axes of the propeller stage and the core are relatively small such that a single engine nacelle may be conveniently used to contain the core and propeller stage drive gear.

In some embodiments the core is provided with a core nacelle and at least a portion of drive gear for the propeller stage is provided with a propeller stage nacelle, the blades of the propeller stage being arranged to rotate outside of the propeller stage nacelle and where the core nacelle and propeller stage nacelle are separate. This may be advantageous where the offset between the rotational axes of the propeller stage and the core are relatively large. There may also be advantages (as explained further below) to the provision of a core nacelle containing the core that may be positioned separately to the propeller stage nacelle having external rotating blades.

In some embodiments connection of the propeller stage nacelle to the propeller stage pylon is direct. The propeller stage nacelle may for example be in pylon, there being no strut between the propeller stage nacelle and the propeller stage pylon.

In some embodiments connection of the core nacelle to the propeller stage pylon and/or the core pylon is direct. The core nacelle may for example be in pylon, there being no strut between the core nacelle and the propeller stage and/or core pylons.

In some embodiments the core is provided with an exhaust that passes around the propeller stage pylon. This may for example be a single exhaust directed around the propeller stage pylon or a bifurcated exhaust with the propeller stage pylon passing between the bifurcations.

In some embodiments at least a proportion of drive components for operatively connecting the core and the propeller stage are contained within the propeller stage pylon. The drive components may for example comprise meshed gears or bevel gears and a transfer shaft. This may be a convenient method of providing drive from the core to the propeller stage while protecting the drive components.

In some embodiments the core and the propeller stage are positioned relative to each other such that in the event of a propeller stage failure the fuselage would be at least partially shielded by the core from at least one potential released debris trajectory incident towards the fuselage. It may be in particular that parts of the fuselage or airframe that have a structural function are shielded. Further the arrangement may mean that there is increased separation and shielding between the blades of different engine installations and potentially therefore a decrease in the likelihood of a released blade fragment striking the blades of another engine installation. Shielding may be achieved by at least a portion of the core being positioned between the blades and the fuselage.

In some embodiments the blades of the propeller stage are positioned forward of the propeller stage pylon and at least a portion of the core is positioned between the blades and the fuselage. It may be for example that both the propeller stage nacelle and the core nacelle are positioned substantially forward of the propeller stage pylon. This may be particularly convenient where the propeller stage has a puller configuration. Relative positioning of the blades and core as described may provide a required level of shielding for the fuselage in the event of a blade fragment release. Further the positioning of the blades forward of the propeller stage pylon may mean that the blades do not experience a wake from the propeller stage pylon (with attendant performance and noise benefits).

In some embodiments the propeller stage and core are positioned such that the blades extend into a forward or aft projection of the core position.

In some embodiments the blades of the propeller stage are positioned aft of the propeller stage pylon and the core is positioned forward of the propeller stage pylon. This may be particularly convenient where the propeller stage has a pusher configuration. Relative positioning of the blades and core as described may allow the blades to overlap a rearward projection of the core position, allowing a shorter propeller stage pylon. A shorter pylon may be lighter and cause less drag. Further exhaust from the core may provide at least some shielding of the fuselage from noise originating from the propeller stage. Exhaust from the core may also attenuate noise reflected from the fuselage.

In some embodiments an exhaust of the core may be ducted to reduce or prevent the incidence of exhaust gas into the blades of the propeller stage. This may allow the blade tips to pass closer to the fuselage (allowing reduced propeller stage pylon length) without exhaust gases from the core being incident on the blades.

In some embodiments the propeller stage is of an open-rotor configuration. In other embodiments however the propeller stage may be of a turbo-prop configuration.

According to a second aspect of the invention there is provided an aircraft provided with a fuselage mounted gas turbine engine installation in accordance with the first aspect of the invention.

The skilled person will appreciate that a feature described in relation to any one of the above aspects of the invention may be applied mutatis mutandis to any other aspect of the invention.

BRIEF DESCRIPTION OF THE DRAWINGS

Embodiments of the invention will now be described by way of example only with reference to the Figures, in which:

Referring to FIG. 1, a twin-spooled, contra-rotating propeller gas turbine engine is generally indicated at 10 and has a rotational axis 9. The engine 10 comprises a core engine 11 having, in axial flow series, an air intake 12, a low pressure compressor 14, a high-pressure compressor 15, combustion equipment 16, a high-pressure turbine 17, a low pressure turbine 18, a free power (or low-pressure) turbine 19 and a core exhaust nozzle 20. A nacelle 21 generally surrounds the core engine 11 and defines the intake 12 and nozzle 20 and a core exhaust duct 22. The engine 10 also comprises two contra-rotating propeller stages 23, 24 attached to and driven by the free power turbine 19 via shaft 26. The drive from the free power turbine 19 to the propeller stages 23, 24 is direct, but in other embodiments it could be delivered via a reduction gearbox. The configuration shown, with the propeller stages 23, 24 substantially aft of the core engine 11 is referred to as a pusher configuration.

Figure 1:
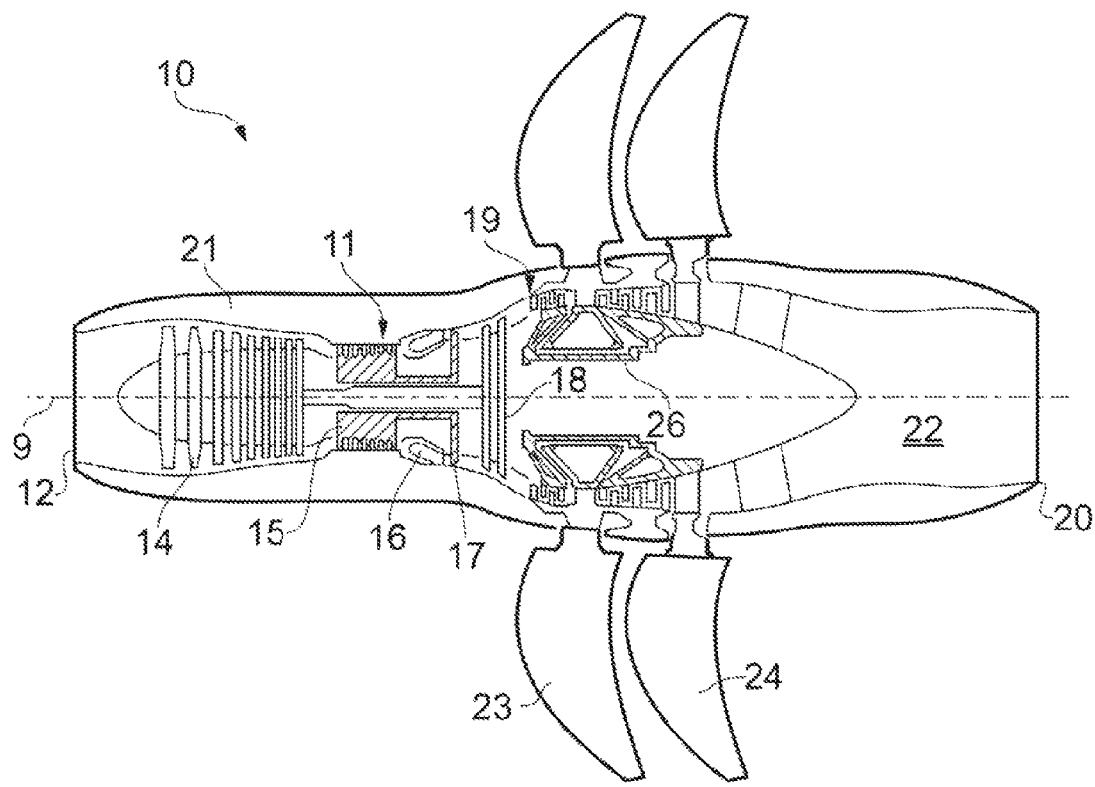
FIG. 1 is a sectional side view of a gas turbine engine having contra-rotating propeller stages.

The gas turbine engine 10 works in a conventional manner so that air entering the intake 12 is accelerated and compressed by the low pressure compressor 14 and directed into the high-pressure compressor 15 where further compression takes place. The compressed air exhausted from the high-pressure compressor 15 is directed into the combustion equipment 16 where it is mixed with fuel and the mixture combusted. The resultant hot combustion products then expand through, and thereby drive the high-pressure, low pressure and free power turbines 17, 18, 19 before being exhausted through the nozzle 20 to provide some propulsive thrust. The high-pressure, low pressure and free power turbines 17, 18, 19 respectively drive the high and low pressure compressors 15, 14 and the propellers 23, 24 by suitable interconnecting shafts. The propellers 23, 24 normally provide the majority of the propulsive thrust. In the embodiments herein described the propellers 23, 24 rotate in opposite senses so that one rotates clockwise and the other anti-clockwise around the engine's rotational axis 9.

Engines such as gas turbine engine 10 may be mounted directly to the fuselage of an aircraft or mounted to the fuselage via a short pylon. Such a pylon would be provided for the purpose of attaching the engine and would be unable (at least in view of its size) to provide the necessary lift for operation of the aircraft that might for example be provided by wings.

Figure 2:
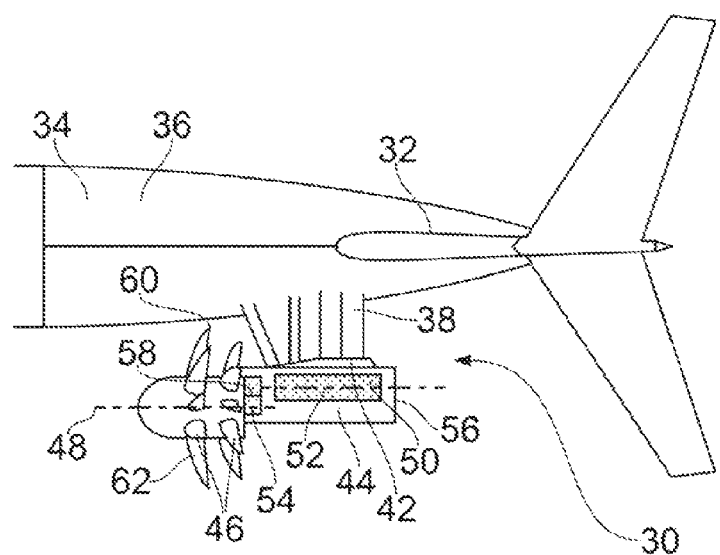
FIG. 2 is a top view showing a fuselage mounted gas turbine engine installation according to an embodiment of the invention.
Figure 3:
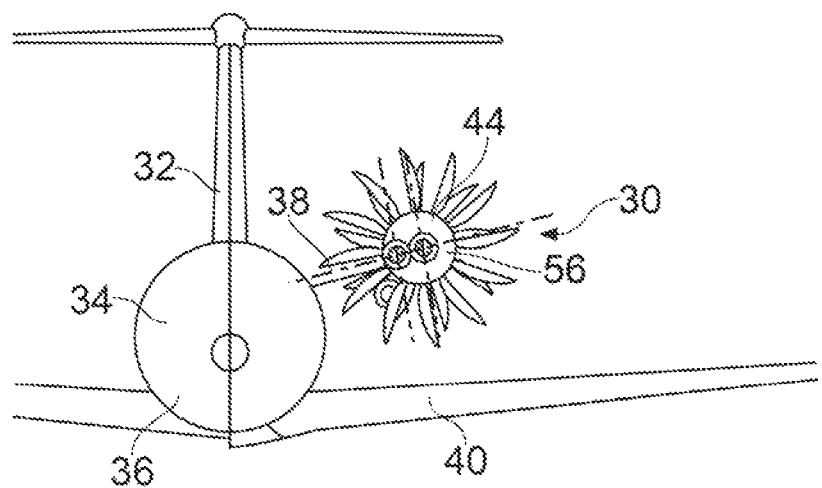
FIG. 3 is a front view showing the fuselage mounted gas turbine engine installation of FIG. 2.

Referring now to FIGS. 2 and 3 a fuselage mounted (e.g. directly mounted to the fuselage or mounted to the fuselage with a pylon) gas turbine engine installation is generally shown at 30. The installation 30 is shown mounted adjacent the empennage 32 of an aircraft 34, extending from its fuselage 36. As will be appreciated the installation 30 is therefore rear mounted.

Extending from the fuselage is a propeller stage pylon 38. The propeller stage pylon 38 is substantially parallel to a wing 40 of the aircraft 34. At a distal end 42 of the propeller stage pylon 38 is an open rotor engine 44 directly connected to the pylon 38. The open rotor engine 44 has two propeller stages 46 sharing a rotational axis 48. The open rotor engine 44 also has a gas turbine core 50 which has a rotational axis 52. The core 50 has an inlet (not shown) which may for example be a single pitot inlet or a bifurcated inlet (e.g. with a first scoop close to the 12 o'clock position and a second scoop close to the 8 o'clock position). The core 50 also has a low pressure compressor (not shown), a high-pressure compressor (not shown), combustion equipment (not shown), a high-pressure turbine (not shown), a low pressure turbine (not shown), a free power turbine (not shown) and a core exhaust nozzle (not shown). As will be appreciated however in alternative embodiments the configuration of the core 50 could be altered somewhat (e.g. by omission of the low pressure system). In this embodiment the two propeller stages 46 are substantially forward of the core 50 and are therefore in a puller configuration.

The rotational axis 48 of the propeller stages 46 and the rotational axis 52 of the core 50 are off-set with respect to each other (that is they are not co-axial). In this case the rotational axes 48, 52 are radially off-set, with the axis 52 being nearer to the fuselage 36 than the axis 48. Despite the off-set the drive gear 54 of the propeller stages 46 and the core 50 are enclosed in a single engine nacelle 56.

In use the core 50 drives the propeller stages 46 via an offset gearbox 58. In this embodiment the gearbox 58 is handed to suit the particular left hand or right hand installation. The radial length of the propeller stage pylon 38 has been selected such that tips 60 of blades 62 of the propeller stages 46 have a desired clearance from the fuselage 36. This clearance may be selected to be sufficient to reduce noise transmission to the fuselage 36 and/or to reduce aerodynamic interaction of a boundary layer of air travelling along the fuselage 36 with air passing through the propeller stages 46. The inbound offsetting of the core 50 reduces the cantilevered load that the open rotor engine 44 exerts at its attachment with the fuselage 36 for a given blade 62 length and particular blade tip 60 clearance. Further because the core 50 is external to the fuselage 36, relative ease of installation and maintenance access may be facilitated.

Figure 4:
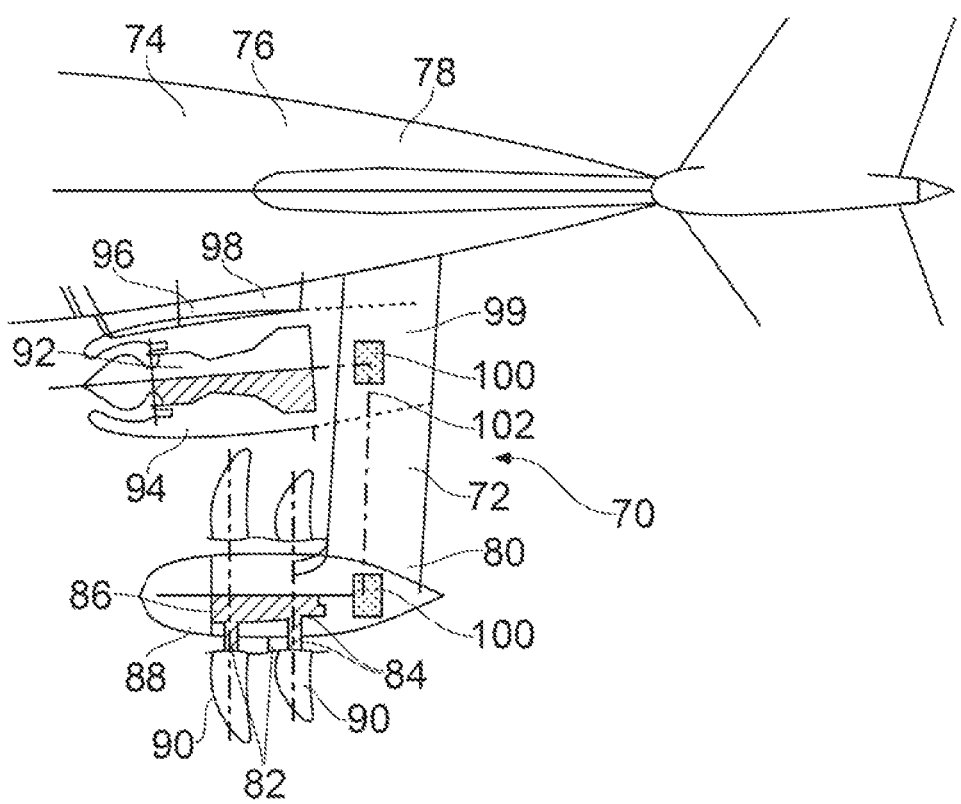
FIG. 4 is a top view with cut-away sections of a fuselage mounted gas turbine engine installation according to an embodiment of the invention.

Referring now to FIG. 4 an alternative fuselage mounted gas turbine engine installation is generally shown at 70. As before a propeller stage pylon 72 extends from a fuselage 74 of an aircraft 76 proximate its empennage 78. Further, and as previously, at a distal end 80 of the propeller stage pylon 72 are two propeller stages 82 sharing a rotational axis. In this embodiment however rotors 84 associated with the propeller stages 82 and a proportion of drive gear 86 used to drive the propeller stages 82 are provided in their own propeller stage nacelle 88 which is directly connected to the propeller stage pylon 72. Blades 90 of the propeller stages 82 rotate outside of and around the propeller stage nacelle 88.

A gas turbine core 92 arranged to drive the propeller stages 82 is also provided. The core 92 has a rotational axis radially offset to that of the propeller stages 82. The core 92 has its own core nacelle 94 connected directly to the distal end 96 of a core pylon 98. The core pylon 98 is substantially parallel to the propeller stage pylon 72, is positioned forward of it and has a shorter radial length. The core 92 comprises a bifurcated exhaust nozzle 99 which envelopes part of the propeller stage pylon 72 and directs exhaust gasses from the core 92 around the propeller stage pylon 72. Drive gear (in this case two bevel gears 100 and a drive shaft 102) operatively linking the core 92 and propeller stages 82 extends through and is enclosed within the propeller stage pylon 72. The bevel gears 100 provide re-orientation of the drive and the transfer shaft 102 operatively connects the bevel gears 100.

Figure 5:
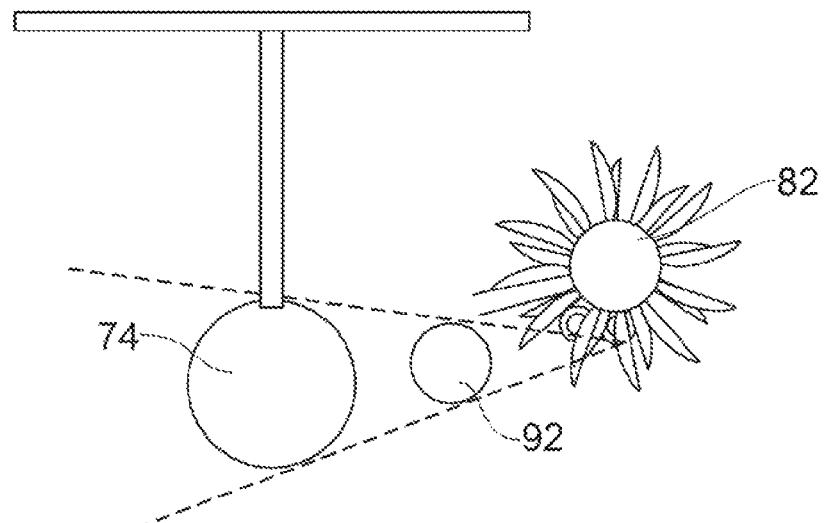
FIG. 5 is a schematic rear view of the fuselage mounted gas turbine engine installation of FIG. 4.

The blades 90 of the propeller stages 82 and the core 92 are positioned forward of the propeller stage pylon 72, with the core 92 positioned radially (laterally) inwards of the blades 90 and between the blades 90 and the fuselage 74. Referring in particular to FIG. 5 the relative positioning of the propeller stages 82 and core 92 is discussed further. As can be seen the core 92 provides a physical shield for the fuselage 74 in the event of debris being released from the propeller stages 82 and having a trajectory towards the fuselage 74 (e.g. resulting from blade 90 release or disc burst). The spacing and relative positioning of the core 92 and propeller stages 82 may be selected to shield structurally important parts of the fuselage 74 and/or a cabin in the fuselage 74. Calculation/modelling of debris trajectories in the event of propeller stage 82 failure may be used in determining this separation and relative positioning and could therefore reduce the overall aircraft risk in the event of a blade release.

A further advantage of the FIGS. 4 and 5 embodiment is that the axial length of the gas turbine installation 70 is relatively short, with a consequent reduction in the potential axial extent of rotor burst trajectories. This may allow more design freedom in positioning the gas turbine installation 70 relative to particular parts of the aircraft structure (such as the tail plane and pressurised cabin) and may also facilitate a reduction in length of the empennage 78 (with associated weight and drag benefits).

In addition to the shielding benefit provided by the position of the core 92, its position nearer to the fuselage will also reduce the overall cantilevered load exerted at attachments with the fuselage 74 when compared to an open rotor engine with core and propeller stages having coaxial rotational axes and located at the radial position of the propeller stages 82.

Figure 6:
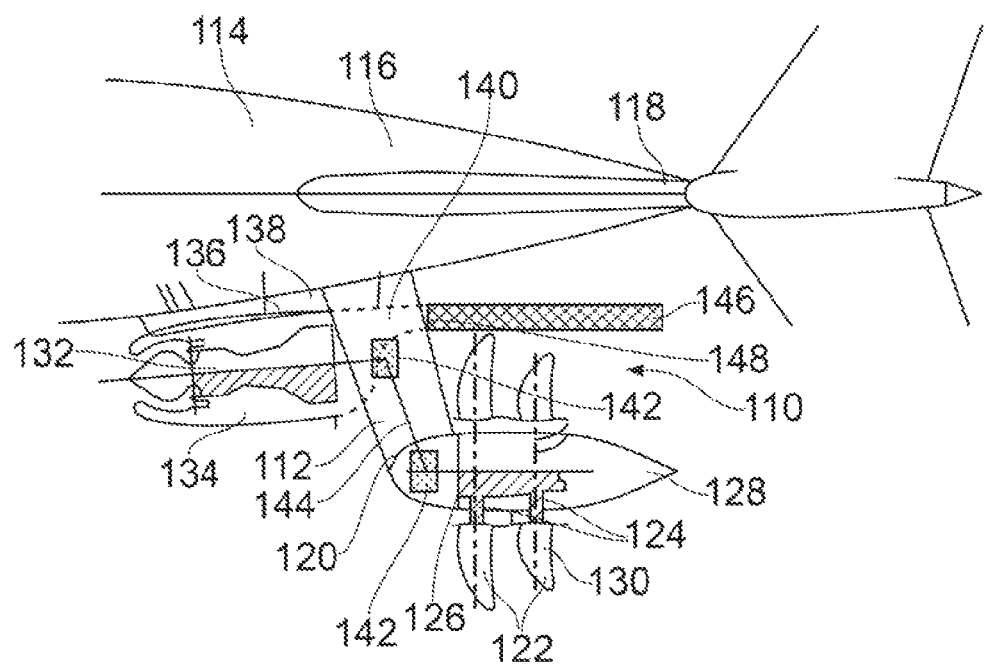
FIG. 6 is a top view with cut-away sections of a fuselage mounted gas turbine engine installation according to an embodiment of the invention.

Referring now to FIG. 6 an alternative fuselage mounted gas turbine engine installation is generally shown at 110. As before a propeller stage pylon 112 extends from a fuselage 114 of an aircraft 116 proximate its empennage 118. Further, and as previously, at distal end 120 of the propeller stage pylon 112 are two propeller stages 122 sharing a rotational axis. Rotors 124 associated with the propeller stages 122 and a proportion of drive gear 126 used to drive the propeller stages 122 are provided in a propeller stage nacelle 128 which is directly connected to the propeller stage pylon 112. Blades 130 of the propeller stages 122 rotate outside of the propeller stage nacelle 128.

A gas turbine core 132 arranged to drive the propeller stages 122 is also provided, with a rotational axis radially and axially offset to that of the propeller stages 122. The core 132 has a core nacelle 134 connected directly to the distal end 136 of a core pylon 138. The core pylon 138 is substantially parallel following the same dihedral as the propeller stage pylon 112, is positioned forward of it and has a shorter radial length. The core 132 comprises a bifurcated exhaust nozzle 140 which envelopes part of the propeller stage pylon 112 and directs exhaust gasses from the core 132 around the propeller stage pylon 112. Drive gear (in this case two bevel gears 142 and a drive shaft 144) operatively linking the core 132 and propeller stages 122 extends through and is enclosed within the propeller stage pylon 112. The bevel gears 142 change the direction of the drive and the transfer shaft 144 operatively connects the bevel gears 142.

The core 132 is positioned forward of the propeller stage pylon 112 and the blades 130 of the propeller stages 122 are positioned aft of the propeller stage pylon 112. The core 132 is positioned radially inwards of the propeller stage nacelle 128, but the blades 130 extend into an aft projection of the core 132 position. As will be appreciated the aft projection is an imaginary projection of the core 132 position centred around the core 132 rotational axis. Consequently and in order to limit impingement of core exhaust 146 on the blades 130, the exhaust nozzle 140 is ducted (having an 'S' shape), such that the blades 130 do not extend into an aft projection of an exhaust nozzle outlet 148. Additionally the exhaust nozzle outlet 148 is elongated away from circular to produce an exhaust 146 that screens a greater proportion or all of the fuselage 114 from acoustic waves generated by the propeller stages 122. This may absorb some sound preventing it reaching a cabin in the fuselage 114. Further sound may be attenuated in the exhaust 146 following reflection at the fuselage 114.

Positioning the core 132 forward and the propeller stages 122 aft of the propeller stage pylon 112, together with the extension of the blades 130 into an aft projection of the core 132 position, means that the propeller stage pylon 112 may be shorter than would otherwise be required. This may reduce drag produced by the propeller stage pylon 112 and may also reduce the cantilevered load exerted at the attachment of the propeller stage pylon 112 to the fuselage 114.

It will be understood that the invention is not limited to the embodiments above-described and various modifications and improvements can be made without departing from the various concepts described herein. Any of the features may be employed separately or in combination with any other features and the invention extends to and includes all combinations and sub-combinations of one or more features described herein in any form of fuselage mounted gas turbine engine installation.

The invention claimed is:

1. A fuselage mounted gas turbine engine installation, the installation comprising:
   at least one propeller stage that defines a plane of rotation substantially perpendicular to an axis of rotation of the propeller stage; and
   a gas turbine core configured, in use, to drive the propeller stage, where the core is external to the fuselage and the rotational axes of the core and propeller stage are offset with respect to each other, the core and the propeller stage being positioned relative to each other such that the plane of rotation of the propeller stage passes through the core between the propeller stage and the fuselage.

2. The fuselage mounted gas turbine engine installation according to claim 1, where the position of the core is disposed such that the cantilevered load produced by the core and propeller stage combined is reduced in comparison with a combined cantilevered load that would be produced if the rotational axes of the core and propeller stage were the same.

3. The fuselage mounted gas turbine engine installation according to claim 1, where the installation is rear mounted on the fuselage.

4. An aircraft provided with a fuselage mounted gas turbine engine installation in accordance with claim 1.

5. The fuselage mounted gas turbine engine installation according to claim 1, where
   the core is provided with a core nacelle, and
   at least a portion of drive gear for the propeller stage is provided within a propeller stage nacelle, the blades of the propeller stage being arranged to rotate outside of the propeller stage nacelle and where the core nacelle and propeller stage nacelle are separate.

6. The fuselage mounted gas turbine engine installation according to claim 5, where the core is at least partially supported by a core pylon.

7. The fuselage mounted gas turbine engine installation according to claim 6, where the propeller stage is supported by a propeller stage pylon which extends from the fuselage.

8. The fuselage mounted gas turbine engine installation according to claim 7, where the propeller stage nacelle is directly connected to the propeller stage pylon.

9. The fuselage mounted gas turbine engine installation according to claim 7, where the core is provided with an exhaust that passes around the propeller stage pylon.

10. The fuselage mounted gas turbine engine installation according to claim 7, where at least a proportion of drive components for operatively connecting the core and the propeller stage are contained within the propeller stage pylon.

11. The fuselage mounted gas turbine engine installation according to claim 7, where the blades of the propeller stage are positioned forward of the propeller stage pylon.

12. A gas turbine engine installation mounted to a fuselage, the installation comprising:
    at least one propeller stage; and
    a gas turbine core configured, in use, to drive the propeller stage, where the core is external to the fuselage and rotational axes of the core and propeller stage are offset with respect to each other, the propeller stage and core being positioned such that blades of the propeller stage extend aft of the core position, the core including an exhaust nozzle that is ducted to prevent the incidence of exhaust gas into the blades of the propeller stage.

13. The fuselage mounted gas turbine engine installation according to claim 12, where, in use, exhaust ducted by the exhaust nozzle passes between the propeller stage and the fuselage and passes through a plane of rotation defined by the propeller stage, the plane of rotation being substantially perpendicular to the axis of rotation of the propeller stage.

14. The fuselage mounted gas turbine engine installation according to claim 12, where the exhaust nozzle includes an exhaust nozzle outlet that is elongated to increase the fuselage area screened by an exhaust plume produced by the exhaust nozzle outlet from acoustic waves generated by the propeller stage.

15. The fuselage mounted gas turbine engine installation according to claim 12, where
    the propeller stage is supported by a propeller stage pylon that extends from the fuselage, and
    the blades of the propeller stage are positioned aft of the propeller stage pylon and the core is positioned forward of the propeller stage pylon.

* * * * *